United States Patent [19]
Kaye

[11] 3,843,268
[45] Oct. 22, 1974

[54] SAMPLE CONTAINER FOR LASER LIGHT SCATTERING PHOTOMETERS

[75] Inventor: Wilbur I. Kaye, Fullerton, Calif.

[73] Assignee: Beckman Instruments, Inc., Fullerton, Calif.

[22] Filed: July 5, 1973

[21] Appl. No.: 376,898

[52] U.S. Cl.................. 356/246, 250/574, 250/576
[51] Int. Cl. ............................................ G01n 1/10
[58] Field of Search ........... 250/574, 576; 356/103, 356/104, 244, 246

[56] References Cited
OTHER PUBLICATIONS

Kaye et al., Polymer Letters, Volume 9, pages 695–699, 1971.
Kaye et al., Applied Optics, Vol. 12, No. 3, March, 1973, pages 541–550.

*Primary Examiner*—John K. Corbin
*Assistant Examiner*—F. L. Evans
*Attorney, Agent, or Firm*—R. J. Steinmeyer; J. G. Mesaros

[57] ABSTRACT

In a laser photometer for measuring radiant power scattered from a sample at a selectable, small forward angle with respect to the direction of an incident beam of radiant power, there is disclosed an improved sample container comprising first and second thick, transparent windows; a spacer between the windows having first and second coaxial, intersecting passageways therein, the beam from the laser entering the first window and the first passageway and the scattered radiant power exiting through the second passageway and the second window; and a black glass disc positioned at the intersection of the passageways, the disc having an aperture therein forming a cell for the sample which is coaxial with the first and second passageways, the laser beam being focused in the aperture, the disc operating to absorb light scattered from the second window thereby reducing background scattering and the usable scattering angle of the photometer.

10 Claims, 2 Drawing Figures

SAMPLE CONTAINER FOR LASER LIGHT SCATTERING PHOTOMETERS

BACKGROUND OF THE INVENTION

1. Field of the Invention

The present invention relates to a sample container for laser light scattering photometers and, more particularly, to a sample container which reduces background scattering and the usable scattering angle in laser light scattering photometers.

2. Description of the Prior Art

Inhomogeneity in the polarizability of liquids and solids leads to the scattering of an incident beam of light. Since this inhomogeneity extends to molecular dimensions, it can be used to characterize the size, motion, and thermodynamic behavior of molecules. The inhomogeneity may be a consequence of fluctuations in concentration or density or may simply result from interfaces between molecular aggregates of different polarizability or refractive index. Consequently, light scattering can be used to study solutions, dispersions, and surfaces.

The intensity of scattered radiant energy depends upon the wavelength of the incident radiant energy, the polarizability of the particles or molecules compared with that of the medium in which they are suspended, and on the size and concentration of the particles. It has also been found that the intensity of the radiant energy scattered in the forward direction by a single particle will be proportional to the square of its volume and independent of its shape if the particle is isotropic and if its dimensions are small compared to the wavelength of the incident radiant energy. Since the forward radiant energy scattered by a dispersion containing particles is greater as the individual particles become larger, the size of the particles may be determined from the intensity of the radiant energy scattered when the refractive indices of the particles and of the medium are known. In a similar manner, the scattering properties associated with particle size have been adapted to the determination of the molecular weights of large molecules.

Light scattering is potentially faster, more accurate, and applicable over a wider molecular-weight range than other techniques employing viscosity, osmometry, or gravitational sedimentation. However, several problems have plagued light scattering measurements. In the first instance, the solutions have to be clarified — freed of particles — a procedure that has sometimes required days of preparation. Secondly, large volumes of sample have been required.

The light scattering technique most frequently employed for molecular weight determination involves preparation of a Zimm plot. Extrapolation of the Zimm plot to zero angle and zero concentration permits the determination of the weight average molecular weight. Unfortunately, this extrapolation to zero angle is subject to large errors when the angular function is non-linear and when particles contaminate the sample. Molecular weights above a few million are particularly difficult to determine because of uncertainties in the extrapolation to zero angle.

These measurements would be facilitated and accuracy would be improved if they could be obtained directly at very low angles and concentrations. These problems have stimulated numerous efforts to develop instruments operating at small scattering angles and small sample volumes. Unfortunately, the minimum scattering angle of most commercial light scattering photometers is 20°–30°. Attempts to reduce the scattering angle in custom instruments have been limited to 10°–15° because background signals from unwanted reflections and particulate contaminants increase rapidly with a decrease in scattering angle.

One of the most recent developments in this rapidly evolving field is the measurement of light scattered at small forward angles using a laser as the source of illuminating radiant energy. The laser provides a narrow beam of intense radiant energy which is both monochromatic and coherent in nature. The narrow beam permits scattering measurements at small angles relative to the incident direction of the laser beam. The intensity of the radiant energy contained in the beam enables greater sensitivities than photometer instruments not employing the laser as a source.

Perhaps the greatest advantage of the use of a laser for molecular weight determination is in minimizing the clarification problem. Defraction of incident light scattered by foreign particles of a size comparable to the wavelength of light increases drastically as the scattering angle $\theta$ decreases. This problem is a major contributor to the hazard in extrapolating the Zimm plot to zero angle. However, a laser beam can be focused to a small diameter, achieving an extremely small scattering volume. Typical scattering volumes encountered heretofore were approximately 1 ml whereas this has been reduced to $10^{-4}$ to $10^{-6}$ ml in a laser photometer. As a result, the probability of a foreign particle residing within the scattering volume is proportionately reduced. Because of the high power density, any particle within the scattering volume scatters intensely and its presence is obvious.

The small sample volume required to fill the sample cell further facilitates sample clarification. Sample volumes about 1,000 times less than that of cells in conventional variable angle instruments have been possible. Obviously, with less sample to filter, the clarification can be accomplished in a shorter period of time, an important factor when performing kinetic measurements. The short-path cells also minimize problems of sample absorption. Furthermore, the cell design permits use of flowing filtered samples without allowing them to contact the air.

Another area benefited by the laser is microfluorescence spectroscopy. The monochromatic lines of the laser are useful for exciting fluorescence in a variety of materials and the fact that the beam from these lasers can be focused to a very small spot provides the potential for measurements concerning fluorescence of microscopically small samples. Another application related to fluorescence is the study of excitation and deexcitation processes of the triplet states in organic molecules.

A low angle laser light scattering photometer is described in an article entitled "Light Scattering Measurements on Liquids at Small Angles" by W. I. Kaye, A. J. Havlik, and J. B. McDaniel, Polymer Letters, Volume 9, pages 695–699 (1971). Improvements in this photometer are described in an article entitled "Low Angle Laser Light Scattering – Absolute Calibration" by W. I. Kaye and A. J. Havlik, Applied Optics, Volume 12, No. 3, pages 541–550 (March, 1973) and in an article entitled "Low-Angle Laser Light Scattering"

by W. I. Kaye, Analytical Chemistry, Volume 45, No. 2, pages 221A–225A (February, 1973). These articles describe a low angle laser light scattering photometer including a helium-neon laser operating in the TEM$_{00}$ mode, the rays from which are focused by a lens onto a sample confined within a sample container. Certain of the rays scattered from the sample through an angle $\theta$, defined by an annulus, are focused by a relay lens onto a field stop. Rays passing through the field stop are focused by an objective lens onto the end-window of a photomultiplier detector. The output of the detector is proportional to the total radiant power falling thereon, $P_\theta$.

The primary laser beam, attenuated by suitable attenuators, is transmitted through the sample, in the direction of the incident beam, and is focused by the relay lens onto the field stop. These rays, having a radiant power $P_0$, are then focused by the objective lens onto the end-window of the photomultiplier detector. The ratio $P_\theta/P_0$ is utilized to determine the Rayleigh factor, $R_\theta$, which is then utilized to calculate the molecular weight.

The sample container described in the beforementioned Articles includes two thick silica windows and a black polytetrafluoroethylene "Teflon" spacer. The spacer has first and second coaxial, intersecting, conical passageways therein extending from the opposite ends thereof, the focused beam from the laser entering the first passageway and the scattered radiant power exiting through the second passageway. Samples are typically introduced through hypodermic needles inserted in the spacer.

The surfaces of the windows are highly polished to reduce scattering. However, a certain amount of scattering will always exist. By making the windows of the sample container of such thickness that the outer surfaces thereof are displaced from the aperture by a predetermined distance, most of the radiant power scattered therefrom will be intercepted by the opaque portion of the field stop and will be prevented from passing therebeyond.

In addition, there will be some light, approximately 4 percent of the incident light, which is reflected from the external surface of the window. This reflected light illuminates the sample and the area around the sample where it is rescattered, some of this rescattered light passing to the detector. This creates a background signal which reduces the measurement accuracy and places a limit on the usable scattering angle.

One technique for rendering the spacer opaque and for minimizing the rescattering of the reflected light has been to impregnate the Teflon spacer with carbon black. However, because of the course texture of pigmented Teflon, some rescattering will still occur. Furthermore, the sample flowing through the passageways and the spacer contacts the carbon black therein. The carbon black has, in some cases, adversely affected the sample, such as by absorbing a portion thereof.

SUMMARY OF THE INVENTION

In accordance with the present invention, there is provided a sample container for low angle laser light scattering photometers which solves these problems in a manner unattainable heretofore. The present sample container is completely compatible with a laser photometer having a small beam, a small sample size, and a small scattering volume. The present sample container results in the reduction of background scattering at small scattering angles and reduces the usable scattering angle. This reduction of scattering angle means that the range of particle sizes and molecular weights that can be measured is increased. The present sample container permits the elimination of the carbon black which had been used to pigment the Teflon spacer, which can now be made clear.

Briefly, the present sample container for use in a laser photometer for measuring radiant power scattered from a sample at a selectable, small forward angle with respect to the direction of an incident beam of radiant power, comprises first and second thick, transparent windows; a spacer between the windows having first and second coaxial, intersecting passageways therein, the first passageway being conical and the second passageway being cylindrical, the beam from the laser entering the first window and the first passageway and the scattered radiant power exiting through the second passageway and the second window; and a black glass disc positioned at the intersection of the two passageways, the disc having a conical aperture therein which is a continuation of the surface of the first passageway, such aperture forming a cell for the sample, the circumference of the disc being a continuation of the cylindrical surface of the second passageway. The laser beam is focused in the aperture and the disc absorbs any light scattered from the second window thereby reducing background scattering and the usable scattering angle of the photometer.

OBJECTS

It is therefore an object of the present invention to provide a sample container for laser light scattering photometers.

It is a further object of the present invention to provide a sample container which reduces background scattering and the usable scattering angle in laser light scattering photometers.

It is a still further object of the present invention to provide a sample container for laser light scattering photometers which increases the range of particle size and molecular weights that can be measured.

It is another object of the present invention to provide a sample container for a laser light scattering photometer which eliminates the use of carbon black as a pigmenting material.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
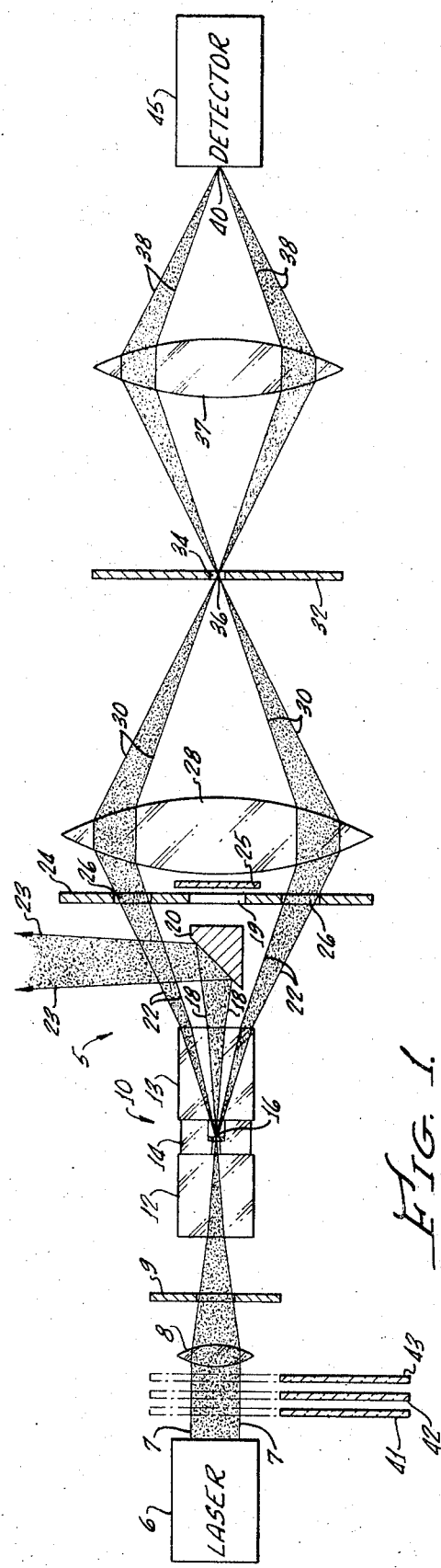
FIG. 1 is a cross-sectional view of the optical elements of a low angle laser light scattering photometer as used for measuring radiant power scattered from a sample at small forward angles relative to the direction of the incident beam, with the present improved sample container in use.

Referring now to the drawings and, more particularly, to FIG. 1 thereof, a low angle laser light scattering photometer of the type described previously, generally designated 5, includes a source of radiant energy 6 which generates a beam of radiant energy defined by the rays 7. Radiant energy source 6 is preferably a helium-neon laser operating in the $TEM_{00}$ mode. The beam from laser 6 is converged by a converging device 8, such as a refractive or reflective lens or an element of similar nature and characteristics, to a small spot or point 16 within a sample container 10 thereby irradiating a sample contained therein with an intense beam of radiant energy. The angle of convergence $\beta$ of the beam is generally small since the smallest angle $\theta$ relative to the direction of the incident beam at which scattered radiant energy from a sample may be measured without intercepting a portion of the transmitted incident beam is equal to $2\beta$. Source mask and aperture 9, which is located closely adjacent converging device 8, intercepts a predetermined amount of the converging beam along with other undesired radiant energy to more accurately define the converging beam passing therethrough.

As will be described more fully hereinafter, sample container 10 includes two thick silica windows 12 and 13 with a clear Teflon spacer 14 therebetween and in contact therewith. An aperture 21 in spacer 14 forms a cell wall, point 16 being centered within such aperture. The cell volume with a 5.0 mm fixed spacer 14 is less than 0.040 ml so that both the sample size and the scattering volume is small.

Radiant energy issuing from the sample within spacer 14 and exiting from sample container 10 at a given angle $\theta$ is illustrated by rays 22. Rays 18 which are transmitted through sample container 10 and are a continuation of the undeflected incident rays are partially reflected as rays 23 from a radiant energy trap 20, with the remaining energy being absorbed by trap 20. Trap 20 may be a dark or black glass cylinder which absorbs radiant energy that enters and which has a 45° surface to partially reflect energy incident thereof at an angle of 90° with respect to the direction of incidence. The combined features of the absorbing glass and 45° surface produce a radiant energy trap substantially more effective than the Rayleigh horn or cone traps and black glass attenuators used heretofore.

Rays 22 issuing from the sample within spacer 14 in an incremental angle $\Delta\theta$ at a given angle $\theta$ are intercepted by an annular aperture 26 in a radiant energy mask 24. Annular aperture 26 is symmetrically located about the axis of the incident beam so that the annular aperture 26 receives all of the energy issuing from the sample at angle $\theta$ in a conical surface having an apex at point 16 and a base formed by aperture 26.

The radiant energy designated by rays 22 intercepted by annular aperture 26 in mask 24 are directed to a converging device 28 where the radiant energy designated by rays 30 are converged into a conical surface having an apex at a point 36. The size of point 36 will depend upon the size of point 16 since point 36 is an image of point 16. Although the converging means 28 illustrated is a refractive lens, other converging apparatus may be employed such as circular reflective mirror, fiber optics, or other devices of similar nature and characteristics.

When it is desired to obtain a measurement of the transmitted incident radiant power defined by rays 18, trap 20 is removed and the rays are permitted to pass through a central aperture 19 in mask 24. The rays which pass through aperture 19 in mask 24 when trap 20 is removed pass through an attenuator 25 to converging device 28 where the rays are converged into a conical surface having an apex at point 36. Attenuator 25 is a safety attenuator to prevent damage to equipment and injury to personnel when trap 20 is removed. Additional calibrated attenuators 41, 42, and 43 may be positiond between source 6 and converging device 8 for insertion in the path of the beam from source 6 when trap 20 is removed. Attenuators 41–43 would be calibrated to reduce the intensity of the beam, when measuring the transmitted energy, to the approximate value of the intensity of the beam when measuring the scattered energy.

A field stop 32 having an aperture 34 therein is positioned such that aperture 34 coincides with point 36 thereby allowing the radiant energy focused onto point 36 to pass through field stop 32. Therefore, and as shown in FIG. 1, light trap 20, radiant energy mask 24, converging device 28, and field stop 32 combine to admit through aperture 34 only the energy issuing from the sample at the given angle $\theta$ and to essentially eliminate other undesired radiant energy.

The radiant energy passing through aperture 34 in field stop 32 is directed to a converging device 37 where the radiant energy designated by rays 38 and the energy in the transmitted beam, not shown, are converged into conical surfaces having an apex at a point 40. Point 40 is made to coincide with a detector 45 where the scattered energy and the transmitted energy are received and detected to provide an output indicative of the radiant power in each beam. Detector 45 may be any type of detector having a sensitivity compatible with the wavelength of interest and a receiving area compatible with the optical design. Detectors used heretofore are photodiodes, photomultipliers, phototubes, or other devices of similar nature and characteristics. A suitable detector is described in the beforementioned article in Applied Optics.

In use, and with reference to FIG. 1, rays 7 from laser source 6 are focused by converging device 8 onto a sample confined within sample container 10. Certain of the rays scattered from the sample through an angle $\theta$, defined by annulus 26 in mask 24, are focused by converging device 28 onto aperture 34 of field stop 32. Rays passing through field stop 32 are focused by converging device 37 onto the end-window of a photomultiplier detector. The output of the detector is proportional to the total radiant power falling on the photocathode, $\overline{P}_\theta$. At this time, the transmitted energy is blocked by trap 20.

Thereafter, trap 20 is removed and the rays 7 from laser source 6, attenuated by attenuators 41–43, are transmitted through the sample in the direction of the incident beam and after passing through aperture 19 in mask 24 and attenuator 25 are focused by converging device 28 onto field stop 32. The rays passing through field stop 32 are focused by converging device 37 onto the photocathode of the photomultiplier detector. The output of detector is proportional to the total radiant power falling on the photocathode, $P_0$. The ratio $P_\theta/P_0$ is utilized to determine the Rayleigh factor, $R_\theta$, which is then utilized to calculate the molecular weight.

Figure 2:
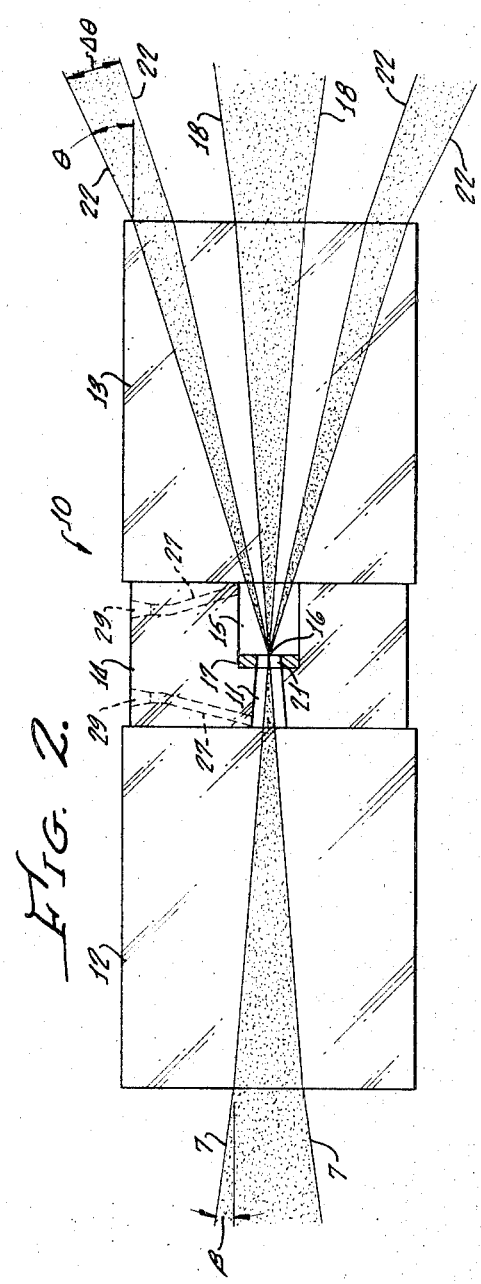
FIG. 2 is an enlarged cross-sectional view of the sample container of FIG. 1.

Referring now to FIG. 2, spacer 14 has first and second coaxial, intersecting passageways 11 and 15, respectively, therein, passageway 11 being conical and passageway 15 being cylindrical. Rays 7 from laser 6 enter window 12 and passgageway 11 and the scattered and transmitted radiant power exits through passageway 15 and window 13. It should be noted that refraction in windows 12 and 13, which is shown most clearly in FIG. 2, changes the effective angle $\beta$ of the incident beam and the effective angle $\theta$ of the scattered beam from the sample and changes the point of focus 16. This effect must be taken into account in the positioning of the various components.

Sample container 10 further includes a highly polished black glass disc 17 positioned at the intersection of passageways 11 and 15, disc 17 having a conical aperture 21 therein which is a continuation of the conical surface of passageway 11. The circumference of disc 17 is a continuation of the cylindrical surface of passageway 15.

The beam from laser 6 is focused in the center of aperture 21 in disc 17 which forms a cell for the sample. The sample may be introduced by means of a pair of channels 27 which interconnect the outer surface of spacer 14 with passageways 11 and 15, at their intersections with windows 12 and 13, respectively. The external portions 29 of passageways 27 may be tapered, as shown, to accept Teflon or glass Luer fittings which mate with the tapered surfaces. In this manner, the sample is exposed only to Teflon and glass. The other channel 27 is then used to receive the samples so that kinetic measurements may be made.

The surfaces of windows 12 and 13 are highly polished to reduce scattering. However, a certain amount of scattering will always exist. By making windows 12 and 13 of sample container 10 of such thickness that the outer surfaces thereof are displaced from point 16 by a predetermined distance, most of the radiant power scattered therefrom will be intercepted by the opaque portion of field stop 32 and will be prevented from passing beyond field stop 32. The advantage of displacing the surfaces of windows 12 and 13 in such a manner is that surface scratches and surface contaminants produced through use will not interfere with scattering measurements.

In addition, there will be some light, approximately 4 percent of the incident light, which is reflected from the external surface of window 13. This reflected light illuminates the sample and the area around the sample where it is rescattered, some of this rescattered light passing to detector 45, reducing the measurement accuracy and placing a limit on the usable scattering angle.

On the other hand, the construction of spacer 14, including black glass disc 17, minimizes the amount of reflected light which is rescattered towards detector 45. More specifically, by making passageway 15 cylindrical, rather than conical as done heretofore, most of the light reflected by window 13 is either parallel to passageway 15 or at such a small angle relative thereto that it either strikes disc 17 directly or is reflected by passageway 15 onto disc 17. Furthermore, since black glass disc 17 is capable of being highly polished, which is not the case with the Teflon of which spacer 14 is constructed, essentially all of the light striking disc 16 is absorbed thereby and very little light is scattered from disc 17 towards detector 45. This lowers the unwanted or background signal at small scattering angles and reduces the usable scattering angle at which photometer 5 may be operated.

It can therefore be seen that in accordance with the present invention, there is provided a sample container for low angle laser light scattering photometers which solves the problems discussed hereinbefore. Sample container 10 is completely compatible with a laser photometer having a small beam, a small sample size, and a small scattering volume. Sample container 10 results in the reduction of background scattering at small scattering angles and reduces the usable scattering angle. This reduction of scattering angle means that the range of particle sizes and molecular weights that can be measured is increased. Sample container 10 also permits the elimination of the carbon black which had been used previously to pigment Teflon spacer 14, which can now be made clear.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a laser photometer for measuring radiant power scattered from a sample at a selectable angle with respect to the direction of an incident beam of radiant power, an improved sample container comprising:
   first and second thick, transparent windows;
   a spacer between and in contact with said windows, said spacer having first and second coaxial intersecting passageways therein extending from the opposite ends thereof, the beam from said laser entering said first window and said first passageway in said spacer and said scattered radiant power exiting through said second passageway and said second window; and
   means positioned at said intersection of said passageways for absorbing light scattered toward said sample from said second window, said means having an aperture therein forming a cell for said sample which is coaxial with said first and second passageways, said laser beam being focused in said aperture.

2. In a laser photometer according to claim 1, the improvement wherein said absorbing means comprises:
   an abosrbing disc having a diameter equal to the diameter of said second passageway.

3. In a laser photometer according to claim 1, the improvement wherein said absorbing means comprises:
   a black glass disc having an aperture therein.

4. In a laser photometer according to claim 3, the improvement wherein the surface of said first passageway is conical, wherein said aperture in said disc is conical, and wherein the surface of said aperture in said disc is a continuation of the surface of said first passageway.

5. In a laser photometer according to claim 4, the improvement wherein the surface of said second passageway is cylindrical and wherein the circumference of said disc is a continuation of said cylindrical surface of said second passageway.

6. In a laser photometer according to claim 3, the improvement wherein said spacer is constructed of unpigmented polytetrafluoroethylene.

7. A sample container for an optical system comprising:
- first and second transparent windows;
- a spacer between and in contact with said windows, said spacer having first and second coaxial intersecting passageways therein extending from the opposite ends thereof; and
- a black glass disc positioned at said intersection of said passageways, said disc having an aperture therein forming a cell for said sample which is coaxial with said first and second passageways.

8. A sample container according to claim 7 wherein said spacer is constructed of unpigmented polytetrafluoroethylene.

9. A sample container according to claim 7 wherein the surface of said first passageway is conical, wherein said aperture in said disc is conical, and wherein the surface of said aperture in said disc is a continuation of the surface of said first passageway.

10. A sample container according to claim 9 wherein the surface of said second passageway is cylindrical and wherein the circumference of said disc is a continuation of said cylindrical surface of said second passageway.

* * * * *